United States Patent
Nadas et al.

(10) Patent No.: US 8,605,592 B2
(45) Date of Patent: Dec. 10, 2013

(54) METHOD AND ARRANGEMENT IN A COMMUNICATION SYSTEM

(75) Inventors: Szilveszter Nadas, Budapest (HU); Peter Lundh, Skarholmen (SE); Zoltan Nagy, Szeged (HU); Sandor Racz, Cegled (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 279 days.

(21) Appl. No.: 13/120,354

(22) PCT Filed: Dec. 19, 2008

(86) PCT No.: PCT/SE2008/051535
§ 371 (c)(1),
(2), (4) Date: Mar. 22, 2011

(87) PCT Pub. No.: WO2010/036168
PCT Pub. Date: Apr. 1, 2010

(65) Prior Publication Data
US 2011/0176422 A1    Jul. 21, 2011

Related U.S. Application Data

(60) Provisional application No. 61/099,289, filed on Sep. 23, 2008.

(51) Int. Cl.
*H04J 1/16* (2006.01)
*H04W 4/00* (2009.01)

(52) U.S. Cl.
USPC ............ 370/235; 370/252; 370/328; 370/465

(58) Field of Classification Search
USPC ......... 370/229, 230, 233, 234, 235, 236, 252, 370/465, 328
See application file for complete search history.

(56) References Cited

U.S. PATENT DOCUMENTS

| | | | |
|---|---|---|---|
| 2001/0016494 A1* | 8/2001 | Hayashi et al. | 455/442 |
| 2005/0020273 A1* | 1/2005 | Fong et al. | 455/453 |
| 2006/0126509 A1 | 6/2006 | Abi-Nassif et al. | |
| 2006/0182065 A1* | 8/2006 | Petrovic et al. | 370/332 |
| 2007/0293235 A1* | 12/2007 | Inayoshi et al. | 455/455 |

(Continued)

FOREIGN PATENT DOCUMENTS

| | | |
|---|---|---|
| WO | 2006/103136 A1 | 10/2006 |
| WO | 2008066427 A1 | 6/2008 |
| WO | 2008066428 A1 | 6/2008 |

OTHER PUBLICATIONS

Ko, B.-J. et al. "Scalable Service Differentiation in a Shared Storage Cache." 23rd International Conference on Distributed Computing Systems, May 19-23, 2003.
Nadas, S. et al. "Providing Congestion Control in the Iub Transport Network for HSDPA." IEEE Global Telecommunications Conference, 2007 (GLOBECOM '07), Washington, DC, USA, Nov. 26-30, 2007.

(Continued)

*Primary Examiner* — Andrew Lee
(74) *Attorney, Agent, or Firm* — Coats and Bennett, P.L.L.C.

(57) ABSTRACT

The present invention proposes a solution in the area of HSDPA flow control. It proposes an improvement to transport network congestion detection and avoidance. The improvement proposes to use a measurement of incoming bitrate to determine the reduction of bitrate after a transport network congestion event. The advantage is that high bitrate reduction is only used when it is necessary; otherwise only small bitrate reduction is used, which results in small oscillation, and consequently higher transport network utilization.

12 Claims, 5 Drawing Sheets

(56) References Cited

U.S. PATENT DOCUMENTS

| | | | |
|---|---|---|---|
| 2008/0119183 A1* | 5/2008 | Kono | 455/432.1 |
| 2008/0194263 A1* | 8/2008 | Usuda et al. | 455/442 |
| 2009/0005049 A1* | 1/2009 | Nishio et al. | 455/442 |
| 2010/0035619 A1* | 2/2010 | Panico et al. | 455/446 |
| 2011/0151885 A1* | 6/2011 | Buyukkoc et al. | 455/452.1 |

OTHER PUBLICATIONS

Weerawardane, T. et al. "Preventitive and Reactive based TNL Congestion Control Impact on the HSDPA Performance." IEEE Vehicular Technology Conference, 2008 (VTC Spring 2008), Singapore, May 11-14, 2008.

* cited by examiner

METHOD AND ARRANGEMENT IN A COMMUNICATION SYSTEM

TECHNICAL FIELD

The present invention relates to a method and an arrangement in a communication network system and, more particular, to a bitrate reduction improvement for rate-based HSPA flow control.

BACKGROUND

The main architectural novelty of High Speed Downlink Packet Access (HSDPA) is that the control of radio frame scheduling has been moved from Radio Network Controller (RNC) to Node Bs. While fix capacity, such as e.g. 64 kbps, may be reserved for traditional Dedicated Channel (DCH) traffic in the access network, for HSDPA, per flow bandwidth reservation is not efficient, because air interface throughput is much higher and fluctuates more. If bandwidth reservation is not used then a congestion situation may occur both in the transport network and in the air interface. In the current architecture, Transmission Control Protocol (TCP) cannot efficiently resolve a congestion situation in the access network, because lower layer retransmissions hide the congestion situations from TCP. Thus a flow control function has been introduced to control the data transfer between the RNC and Node B.

The Flow Control (FC) was designed to take only the transmission capabilities of the air interface into account and to limit the latency of layer 2 signaling. However, the increased air interface capacity did not always come with similarly increased Iub transport network capacity in practice. Iub is the interface between the Node B and an RNC. The cost of Iub/Iur transport links is still high and is not expected to decrease dramatically. It is a common scenario that the throughput is limited by the capacity available on the Iub/Iur Transport Network (TN) links and not by the capacity of the air interface. On these high cost links, it is important to maintain high efficiency. The transport network (TN) underneath the Frame Protocol may be realized e.g. as. a cell-switched Asynchronous Transfer Mode (ATM) network or as a packet-based IP network.

While on the air interface it is the task of the air interface scheduler to share the bandwidth among the flows, on the transport network it is the task of the flow control to provide fair bandwidth sharing among the flows of the same priority.

A rate-base flow control must be used, because the lack of sequence numbering and retransmission in the third Generation Partnership Project (3GPP) standard does not allow a window based flow control, like TCP. Note that while Radio Link Control (RLC) in the 3G system provides sequence numbering and retransmission functionality, the RLC protocol layer is not terminated in Node B, therefore cannot be used for flow control purposes. By rate based flow control is meant that the bitrate of a flow is regulated by the flow control algorithm.

To allow a simple and flexible flow control solution, a per-flow flow control algorithm may be defined for HSDPA.

The algorithm has an initial state, where the algorithm finds an initial capacity level fast. Slow start state is finished when the first congestion is detected. This state is called slow start.

After the first congestion is detected the allowed bitrate of a flow is reduced multiplicatively, e.g. by 50% if a congestion in the transport network is detected and increased linearly if no congestion is detected for a while, e.g. with 40 kbps/s increase rate. This behavior is according to the Additive Increase Multiplicative Decrease (AIMD) property and therefore the bandwidth share of the flows converges to the fair situation.

For the existing rate-based per-flow flow control solutions, two types of different transport network congestion events are defined. Hard congestion indicates serious congestion and results in 50% bitrate reduction, while soft congestion indicates that the transport network starts to be congested and results in 10% rate reduction. In the existing solution, lost or destroyed Iub/Iur High Speed Downlink Shared Channel (HS-DSCH) data frames and dynamic delay larger than 60 ms results in hard congestion, while dynamic delay in the range of 40-60 ms results in soft congestion.

The advantage of soft congestion is that it results in smaller rate decrease in case of moderate congestion. This smaller decrease means smaller oscillation for a rate based congestion control solutions and results in larger utilization of the transport network. However, the HSDPA traffic and peak HSDPA bitrates are expected to be increased and it is expected to result higher speed transport network. Typical transport network speed today is in the order of 1-4 Mbps and typical transport network buffer sizes are 212-1696 kbit. In case of Asynchronous Transfer Mode (ATM) transport network solution, while the transport network capacity is expected to increase significantly, the transport network buffer size is not configurable. With increased transport network capacity and the same buffer sizes, the maximum delay variation is expected to decrease significantly. E.g. the 212 kbit buffer results 212 ms long buffer in case of 1 Mbps transport network, 53 ms for 4 Mbps, and 21.2 ms for 10 Mbps. In this case, the maximum delay variation is decreased and with the current parameters, soft congestion cannot be detected. In this case the system will oscillate between 50% and 100% utilization, resulting 75% average utilization.

The lack of soft congestion thus causes several problems, e.g. 50% capacity decreases result in low utilization between 60 s and 120 s, when there are two users in the system.

One possible solution to the problem could be to tune the dynamic delay limits according to the actual transport network buffer sizes either off-line or on-line in the algorithm. The problem with such solution is that due to the potential delay variation introduced by higher priority traffic lower dynamic delay limits could result in false congestion detections and consequent underutilization.

SUMMARY

The invented solution aims to improve the flow control behavior in the case when the capacity of the transport network is the limiting factor and thereby providing an improved performance in a wireless communication system.

According to a first aspect, the object is achieved by a method in a radio base station for detecting and reducing congestion in a radio access network. The radio base station is comprised within the radio access network. The radio base station is adapted to control the bitrate flow of the incoming traffic from a Radio Network Controller, to the radio base station. The method comprises detecting the occurrence of traffic congestion within the radio access network. Also, the method comprises determination of the congestion event type. Further, the method comprises determining the bitrate reduction based on the determined congestion event type. In addition, the method comprises reducing the allowed bitrate flow of the incoming traffic to the radio base station, according to the determined bitrate reduction.

According to a second aspect, the object is also achieved by an arrangement in a radio base station for detecting and reducing congestion in a radio access network. The radio base station is comprised within the radio access network. The radio base station is adapted to control the bitrate flow of the incoming traffic from a Radio Network Controller, to the radio base station. The arrangement comprises a detection unit. The detection unit is adapted to detect the occurrence of traffic congestion within the radio access network. Further, the arrangement also comprises a first determination unit. The first determination unit is adapted to determine the congestion event type. Additionally, the arrangement further comprises a second determination unit. The second determination unit is adapted to determine the bitrate reduction based on the determined congestion event type. Also, the arrangement in addition comprises a control unit. The control unit is adapted to reduce the allowed bitrate flow of the incoming traffic to the radio base station, according to the determined bitrate reduction.

Thanks to the present methods and arrangements, transport network congestion detection and avoidance are improved as the incoming bitrate is measured to determine the reduction of bitrate after a transport network congestion event. Thereby, high bitrate reduction is only used when it is necessary; otherwise a small bitrate reduction is used, which results in small oscillation, and consequently higher transport network utilization.

Thus the present methods and arrangements improve the flow control behaviour in the case when the capacity of the transport network is the limiting factor. Thereby an improved performance in a wireless communication system is provided.

Other objects, advantages and novel features of the invention will become apparent from the following detailed description of the invention.

BRIEF DESCRIPTION OF THE DRAWINGS

The present invention will now be described more in detail in relation to the enclosed drawings, in which.

DETAILED DESCRIPTION

The invention is defined as a method and an arrangement in a radio base station, which may be put into practice in the embodiments described below. This invention may, however, be embodied in many different forms and should not be constructed as limited to the embodiments set forth herein; rather, these embodiments are provided so that this disclosure will be thorough and complete, and will fully convey the scope of the invention to those skilled in the art. It should be understood that there is no intent to limit the present methods and/or arrangements to any of the particular forms disclosed, but on the contrary, the present methods and arrangements are to cover all modifications, equivalents, and alternatives falling within the scope of the invention as defined by the claims.

Figure 1:
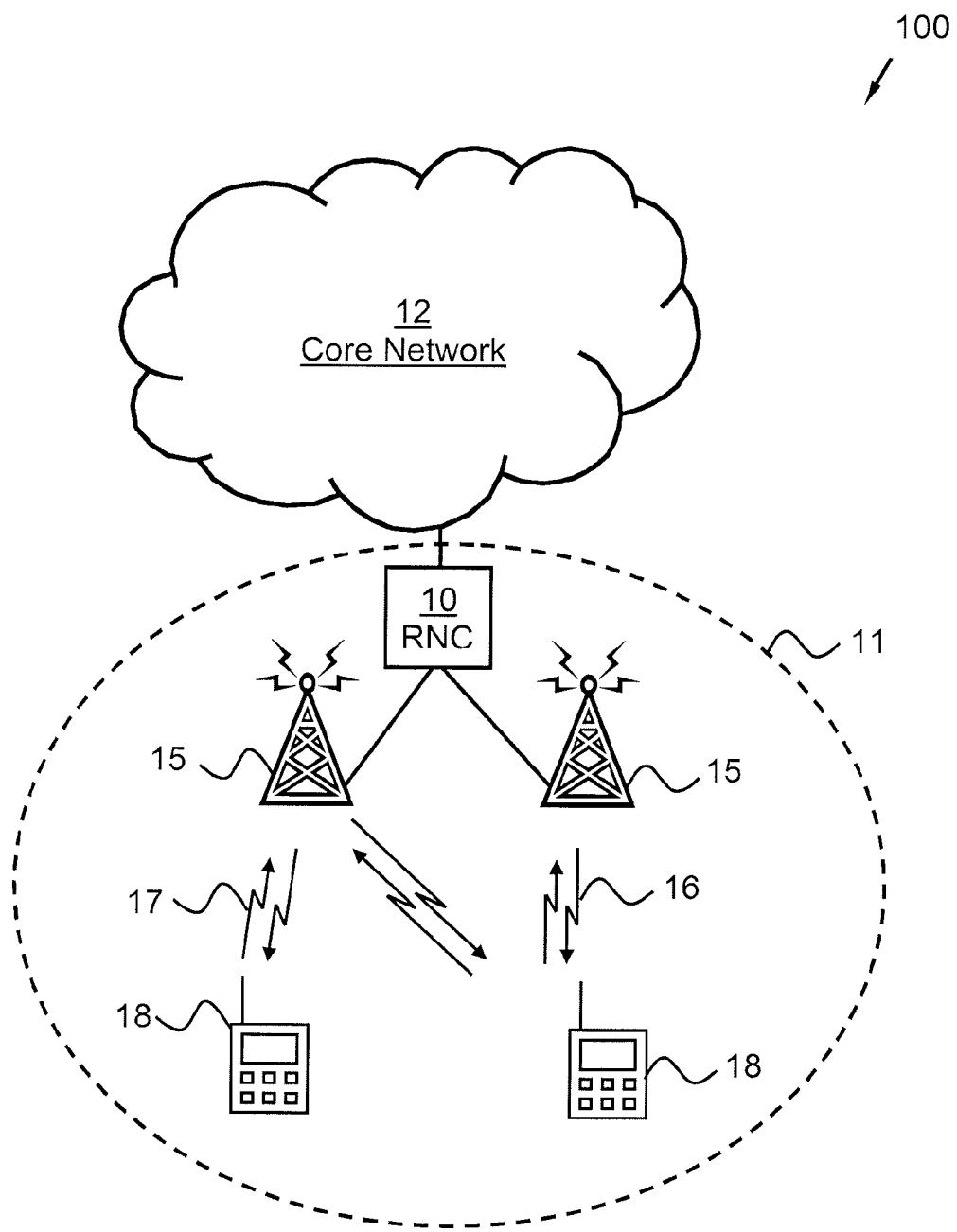
FIG. 1 is a schematic block diagram illustrating a communication system.

FIG. 1 depicts a communication system 100 comprising a Radio Access Network (RAN) 11, such as the UMTS Terrestrial Radio Access Network (UTRAN) architecture. The radio access network 11 comprises at least one Radio Base Station (RBS) 15 connected to one or more Radio Network Controllers (RNCs) 10. Two Radio Base Stations 15 are illustrated in FIG. 1. The radio access network 11 is connected to a Core Network (CN) 12. The radio access network 11 and the Core Network 12 provide communication and control for a plurality of user equipments (UE) 18 that each uses downlink (DL) channels 16 and uplink (UL) channels 17.

For the reason of clarity, only one uplink channel is denoted 17 and one downlink channel denoted 16. On the downlink channel 16, the radio base station 15 transmits to each user equipment 18 at respective power level. On the uplink channel 17, the user equipments 18 transmit data to the radio base station 15 at respective power level.

According to a preferred embodiment of the present invention, the communication system 100 is herein described as a HSDPA communication system. The skilled person, however, realizes that the inventive method and arrangement may be based on other packet based communications systems as well such as e.g. E-UTRAN, LTE, Code division multiple access (CDMA), Wideband Code Division Multiple Access (WCDMA), CDMA 2000, High Speed Uplink Packet Data Access (HSUPA), High Data Rate (HDR), TD-SCDMA, Wimax, etc.

The user equipment 18 may be represented by e.g. a mobile station, a wireless communication terminal, a mobile cellular telephone, a Personal Communications Systems terminal, a Personal Digital Assistant (PDA), a laptop, a computer or any other kind of device capable of managing radio resources. A Personal Communication System terminal may combine a cellular radiotelephone with data processing, facsimile and data communications capabilities. A PDA may include a radiotelephone, a pager, an Internet/intranet access device, a web browser, an organizer, calendars etc. a mobile telephone ("cellular" telephone) and/or laptop with mobile termination and thus may be, for example, portable, pocket, hand-held, computer-included or car-mounted mobile devices which communicate voice and/or data with the radio access network 11.

The radio base station 15 may in some embodiments be referred to as an access point, a Node B, an evolved Node B (eNodeB) and/or a base transceiver station, Access Point Base Station, base station router, etc depending e.g. of the radio access technology and terminology used.

The number of network elements illustrated in FIG. 1 is purely exemplary. Other configurations with more, fewer, or a different arrangement of network elements may be implemented. Moreover, in some embodiments, one or more network elements in FIG. 1 may perform one or more of the tasks described as being performed by one or more other network element in FIG. 1.

The present invention proposes a solution in the area of HSDPA flow control. It proposes an improvement to transport network congestion detection and avoidance. The improvement proposes to use a measurement of incoming bitrate to determine the reduction of bitrate after a transport network congestion event. The advantage is that high bitrate reduction is only used when it is necessary; otherwise only small bitrate reduction is used, which results in small oscillation, and consequently higher transport network utilization.

Thus, according to one embodiment of the present invention, a rate-based congestion control method is provided, where in case of congestion detection the measured incoming bitrate of each flow is used to determine the degree of rate reduction.

According to some embodiments, the degree of reduction is calculated by comparing the shaping bitrate and the incoming bitrate.

Also, according to some further embodiments, the incoming bitrate is measured during a short time period in advance of bitrate reduction decision.

Additionally, according to some embodiments, the reduction is bounded by an upper and lower limit. The upper and lower limit may be dependent on the type of the congestion event experienced.

Further yet, according to some embodiments, instead of setting a limit on the incoming bitrate based reduction directly, more than one reduction value may be calculated and the minimum reduction may be taken.

Still further, according to some embodiments, the incoming bitrate based reduction is used only in case of some specific congestion event type and not used in case of other congestion event type.

Figure 2:
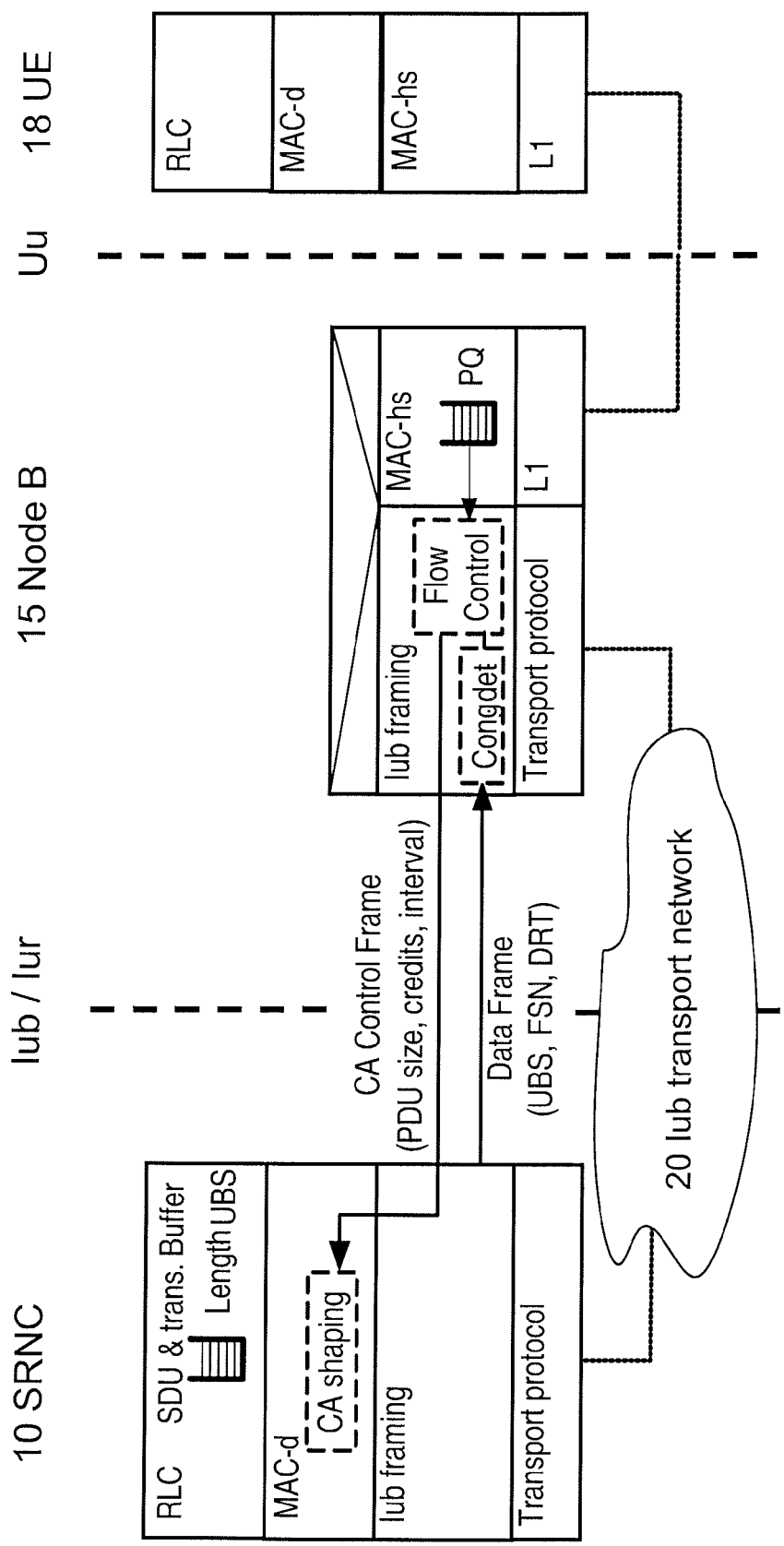
FIG. 2 is a block diagram illustrating a HSDPA flow control architecture and protocol stack.

FIG. 2 illustrates an HSDPA Flow Control architecture and protocol stack.

It is thus illustrated a communication system 100 comprising a Serving Radio Network Controller (SRNC) 10. The Radio Network Controller 10 is a network element that may be responsible for the control of radio resources of the radio access network 11. The SRNC 10 is controlling the radio base station 15 over a Iub/Iur interface. The radio base station 15 is in turn communicating with the user equipment 18 over an air interface Uu. The Uu interface may be an air interface, through which the user equipment 18 accesses the fixed parts of the communication system 100 over the radio base station 15. Communication between the radio base station 15 and the Serving Radio Network Controller 10 may be made over the transport network 20.

Figure 3:
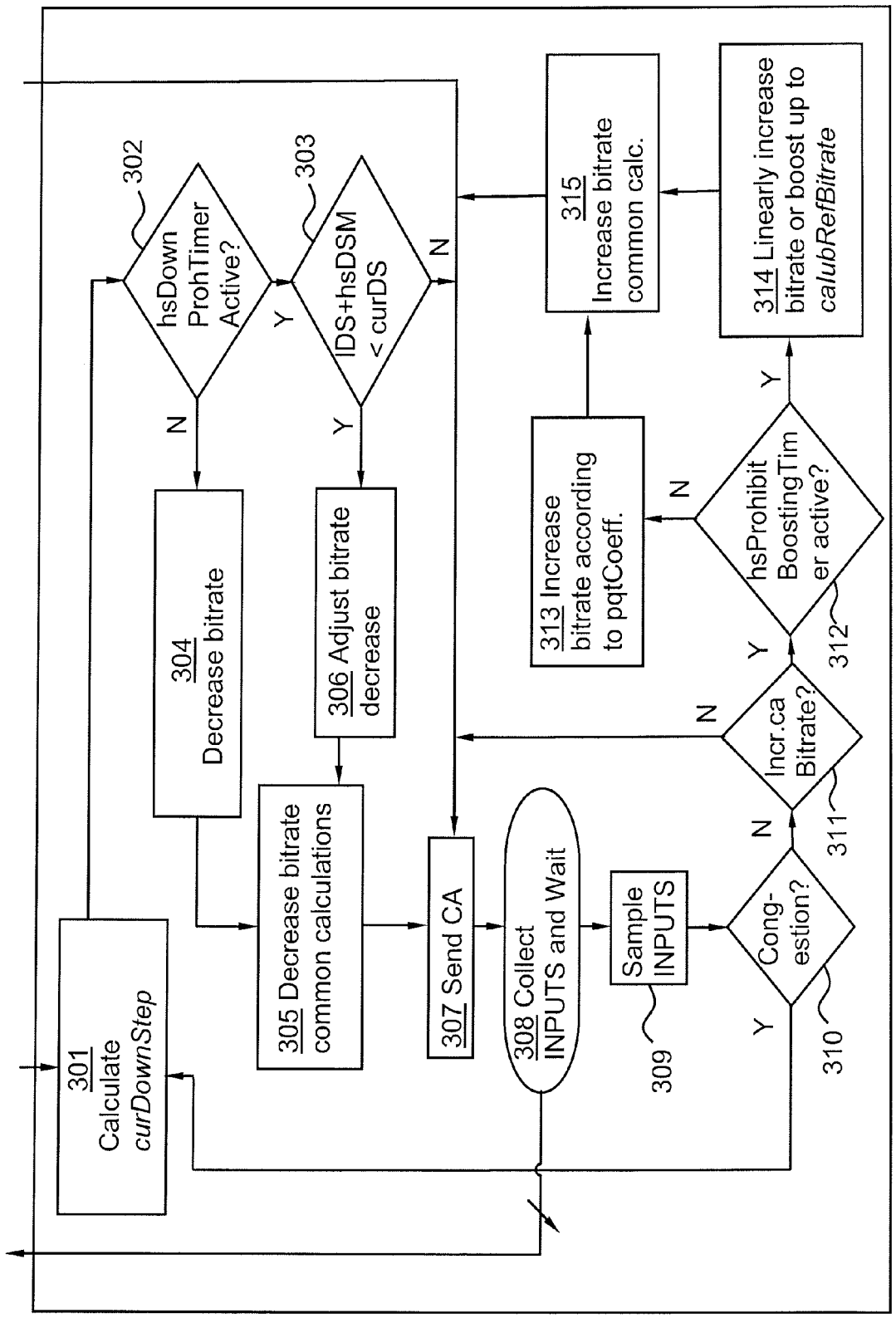
FIG. 3 is a flow chart illustrating a HSDPA flow control.

FIG. 3 illustrates a Congestion Avoidance mechanism 300 in a HSDPA flow control flow chart.

Concept of the Method

The incoming bitrate of all flows in the radio base station 15 may be measured. After the occurrence and detection of a hard congestion, the bitrate may be reduced with a value between 10% and 50%, the hsHardCongCaFactor, depending on the fraction of the measured flow bitrate and the latest signalled credit bitrate, caCreditBitrate. The bitrate caBitrate may be reduced to 90% of the measured bitrate during the last 100 ms, however, according to some embodiments, it may be reduced to at least 10% and at most 50% compared with the latest signalled credit bitrate, caCreditBitrate.

The present method keeps the Additive Increase Multiplicative Decrease (AIMD) property, and consequently the fairness, of the original solution, while greatly improves the adaptation speed. Further, the utilization is increased by reducing the oscillation in bitrate.

New Variables

A number of new variables are introduced. All the herein used variable names may be regarded as non limiting examples only. Any of the here presented variables may be given any other arbitrary name and may be used in the present method without any impact of the functionality of the present method.

The new variables according to some embodiments are hsRecPduOctets100ms, inRate and inRateBasedCurDownStep.

hsRecPduOctets100ms [octets] is the amount of PDU octets received since the last 100 ms tick. inRate [kbps] is the calculated incoming rate of the flow at the last 100 ms. inRateBasedCurDownStep [factor] is the down step factor, calculated based on the inRate. As an example, 0 gives no reduction, 1 gives 100% reduction and 0.1 gives 10% reduction.

When a Hard congestion is detected then inRate and inRateBasedCurDownStep are calculated as follows:

$$\text{inRate [kbps]} = \text{hsRecPduOctets100ms [octet]} \cdot 8 \text{ [bit/octet]}/100 \text{ [ms]}$$

$$\text{inRateBasedCurDownStep} = 1 - \text{MIN(inRate, lastSentCA)} \cdot 0.9/\text{lastSentCa}$$

The resulting downStep due to hard congestion, downStepHardCongestion, may be:
downStepHardCongestion=MIN(inRateBasedCurDownStep, 1−hsHardCongCaFactor)

The consequence of the above calculations may be that the down step due to hard congestion is in the interval from 0.1 to (1−hsHardCongCaFactor), i.e. a bitrate reduction of 10-50%.

Apart from this change in how the downStep due to hard congestion is calculated there is no other change in the downStep determination. Still when more than one congestion types are detected the biggest bitrate reduction may be used, e.g. hard-congestion overrides soft congestion.

Flow Chart Update

The flow chart of the algorithm according to some embodiments of the present method is shown on FIG. 3. Only Congestion Avoidance state 300 is depicted as the change is done in the Congestion Avoidance state 300. The change is considering the measured inRate in the calculation of downstep.

Basic Properties

In this case the multiplicative decrease to the actual in-rate, e.g. measured bitrate during the last 100 ms, instead of the caBitrate is applied. In an ideal system, the in-rate and the caBitrate are very similar and in this way the fairness may be guaranteed. The system may be referred to as non-ideal, thus some fairness degradation may occur. The caBitrate is maintained by the flow control in the radio base station 15 and updated based on the congestion level. When the flow control wants to inform the shaper in the RNC 10 about a new shaping rate such as e.g. a significant change in the caBitrate, then based on the caBitrate, a capacity allocation control frame may be filled in. In capacity allocation, only a finite number of different bitrate values, such as e.g. 16.8 kbps, 25.2 kbps, 33.6 kbps, . . . etc are available to signal. The flow control may thus be rounding up the caBitrate to the closest available bitrate of capacity allocation. This rounded bitrate may be referred to as caCreditBitrate.

The present method and arrangement may with certain advantage be used e.g. in a transport network limited scenario wherein the transport network bottleneck capacity is 15 Mbps and the transport network bottleneck buffer size is 13 ms, the buffer size in bits is 15 Mbps×13 ms~500 ATM cells, just to mention some arbitrary example of implementation.

According to some embodiments, the size of the reduction after a hard congestion is the 90% of the actual bitrate of the flow, measured during the last 100 ms, but at least 10% and at most 50% may be reduced.

As this example shows the present method has significant gain when there is a single user, the communication system 100 is still transport network limited and the transport network buffer is smaller then the soft-congestion limit.

The achievable air interface capacity and the transport network capacities may be higher according to some embodiments of the communication system 100. However, the effect caused by hard congestion according to the present method remains the same, only the bitrates may be increased. In addition to this, a higher transport network capacity also means smaller buffer size in ms, assuming the same buffer size in bits and this means that there will be communication systems 100 where only hard congestion may be used.

The present method increases utilization of the transport network 20 by replacing soft congestion detection in the cases, when the transport network buffer is small. It also provides a solution which may adapt to delay variation introduced by higher priority traffic.

The present method keeps the Additive Increase Multiplicative Decrease (AIMD) property, and consequently the fairness, while it increases utilization by reducing the oscillation in bitrate.

The stability and performance of the solution is very similar to that of the original solution, when soft congestion detection is available. The solution only requires a small modification and may be applied to the original solution.

Method Steps 301-315

If congestion is detected, the Congestion Avoidance state 300 may be entered. The Capacity Allocation may be sent in a step 307. If congestion is detected, curDownStep may be calculated based on different congestion events such as e.g. soft, hard or Uu. The caIubRefBitrate may be set accordingly in a step 301. Thereafter, a control may be made to control if the hsDownProhibitTimer is active in step 302. If it is, it may be controlled if LastDownStep and hsDownStepMargin is smaller than curDownStep in a step 303. If it is, the bitrate decrease may be adjusted in step 306. Thus the caBitrate may be set to one minus curDownStep multiplicated with lastRateBeforeDownStep. Thereafter, bitrate common calculations may be decreased in a method step 305. Thereafter, the capacity allocation may be sent in step 307, if needed. In step 309, inputs may be sampled and in a step 310 a congestion controlled may be performed. If congestion is detected, a method jump may be made back to method step 301. If no congestion is detected, a further control is made if a caBitrate increase is possible in a step 311. If it is, it may be controlled if boosting is disabled. Thus it may be controlled if caBitrate is bigger than caIubRefBitrate in step 312. If it is not, a boost up, up to caIubRefBitrate may be performed. Thus caBitrate may be set to maximum caBitrate plus caIncRate and/or minimum caBitrate multiplicated with pqtCoeff and/or to caIubRefBitrate in step 313. Otherwise, caBitrate may be set to caBitrate+caIncRate and thus additively increase bitrate in a step 314, bitrate common calculations may then be increased in a method step 315. Accordingly, hsRecPduOctets may be reset and caIncRate may be increased. Thereafter, the method may return to step 307 and send a capacity allocation, if needed.

Figure 4:
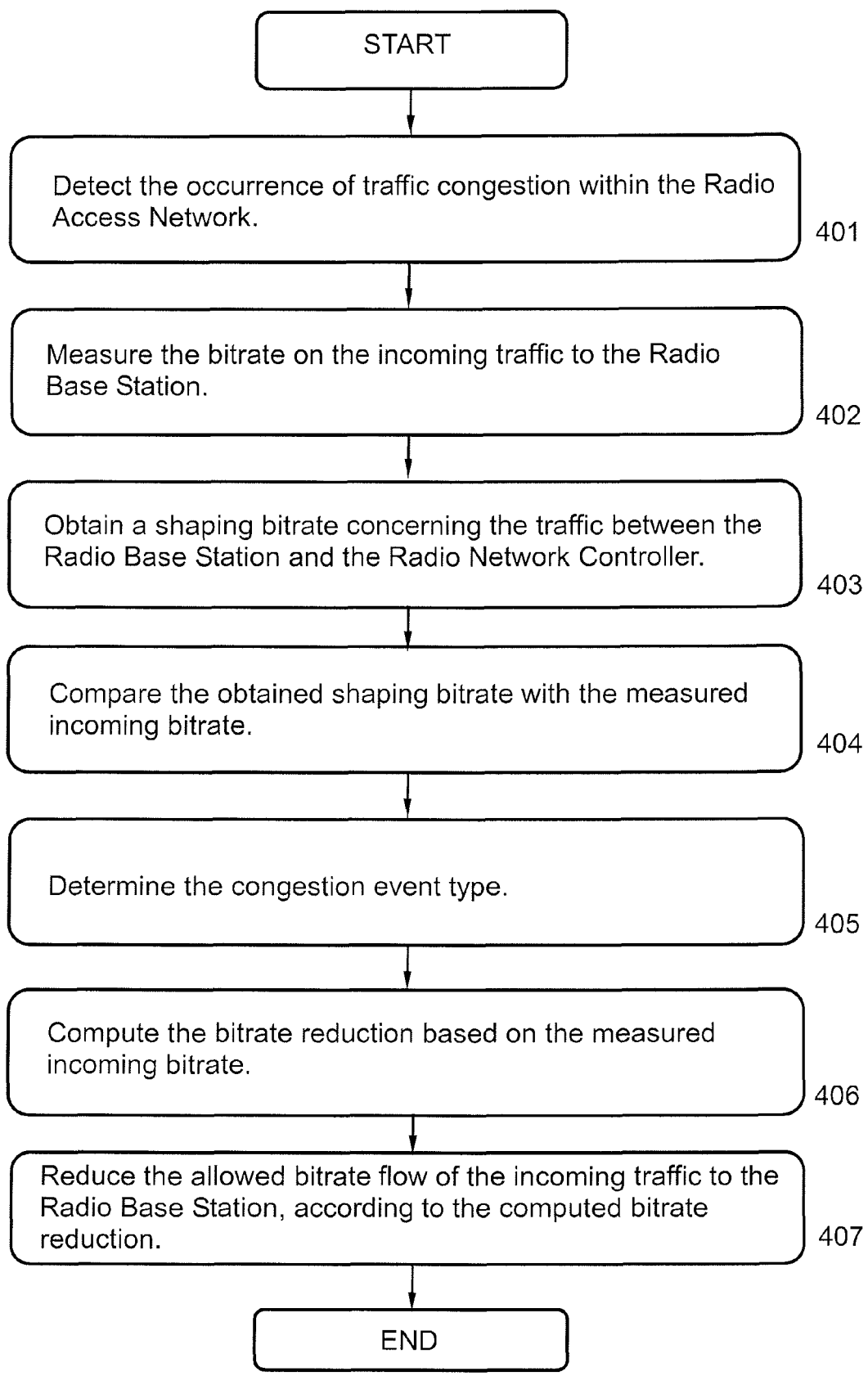
FIG. 4 is a flow chart illustrating embodiments of method steps in a radio base station.

FIG. 4 is a flow chart illustrating embodiments of method steps 401-407 performed in a radio base station 15. The method aims at detecting and reducing congestion in a radio access network 11. The radio base station 15 is comprised within the radio access network 11. The radio base station 15 is adapted to control the bitrate flow of the incoming traffic to the radio base station 15. The traffic is incoming from a Radio Network Controller 10.

To appropriately detect and reduce congestion in a radio access network 11, the method may comprise a number of method steps 401-407.

It is however to be noted that some of the described method steps are optional and only comprised within some embodiments. Further, it is to be noted that the method steps 401-407 may be performed in any arbitrary chronological order and that some of them, e.g. step 401 and step 403, or even all steps may be performed simultaneously or in an altered, arbitrarily rearranged, decomposed or even completely reversed chronological order. The method may comprise the following steps:

Step 401

The occurrence of traffic congestion within the radio access network 11 is detected.

Step 402

The congestion event type is determined. The congestion event type may be e.g. a soft congestion or hard congestion. When more than one congestion types are detected the determination may be determined such that the biggest bitrate reduction may be used, e.g. hard-congestion overrides soft congestion.

Step 403

This step is optional and may only be performed within some embodiments. A shaping bitrate concerning the traffic between the radio base station 15 and the user equipment 18 and the Radio Network Controller 10 may be obtained.

Step 404

This step is optional and may only be performed within some embodiments.

The bitrate on the incoming traffic to the radio base station 15 may be measured. According to some embodiments, the measuring of the incoming bitrate may be performed a short time period in advance of the step of computing 406 the bitrate reduction.

Step 405

This step is optional and may only be performed within some embodiments.

The obtained shaping bitrate may be compared with the measured incoming bitrate in a comparison.

Step 406

The bitrate reduction is determined, based on the determined congestion event type.

According to some optional embodiments, the bitrate reduction may be based on the determined congestion event type and also based on the measured incoming bitrate. According to some optional embodiments, the bitrate reduction may be based on the determined congestion event type and the comparison between the shaping bitrate and the measured bitrate. According to some optional embodiments, the magnitude of the bitrate reduction may be bound by an upper limit value and a lower limit value, which values may be set based on the determined congestion event type. According to some optional embodiments, the magnitude of the bitrate reduction may be set to a value between 0% and 50%.

Step 407

The allowed bitrate flow of the incoming traffic to the radio base station 15 is reduced, according to the determined bitrate reduction.

Figure 5:
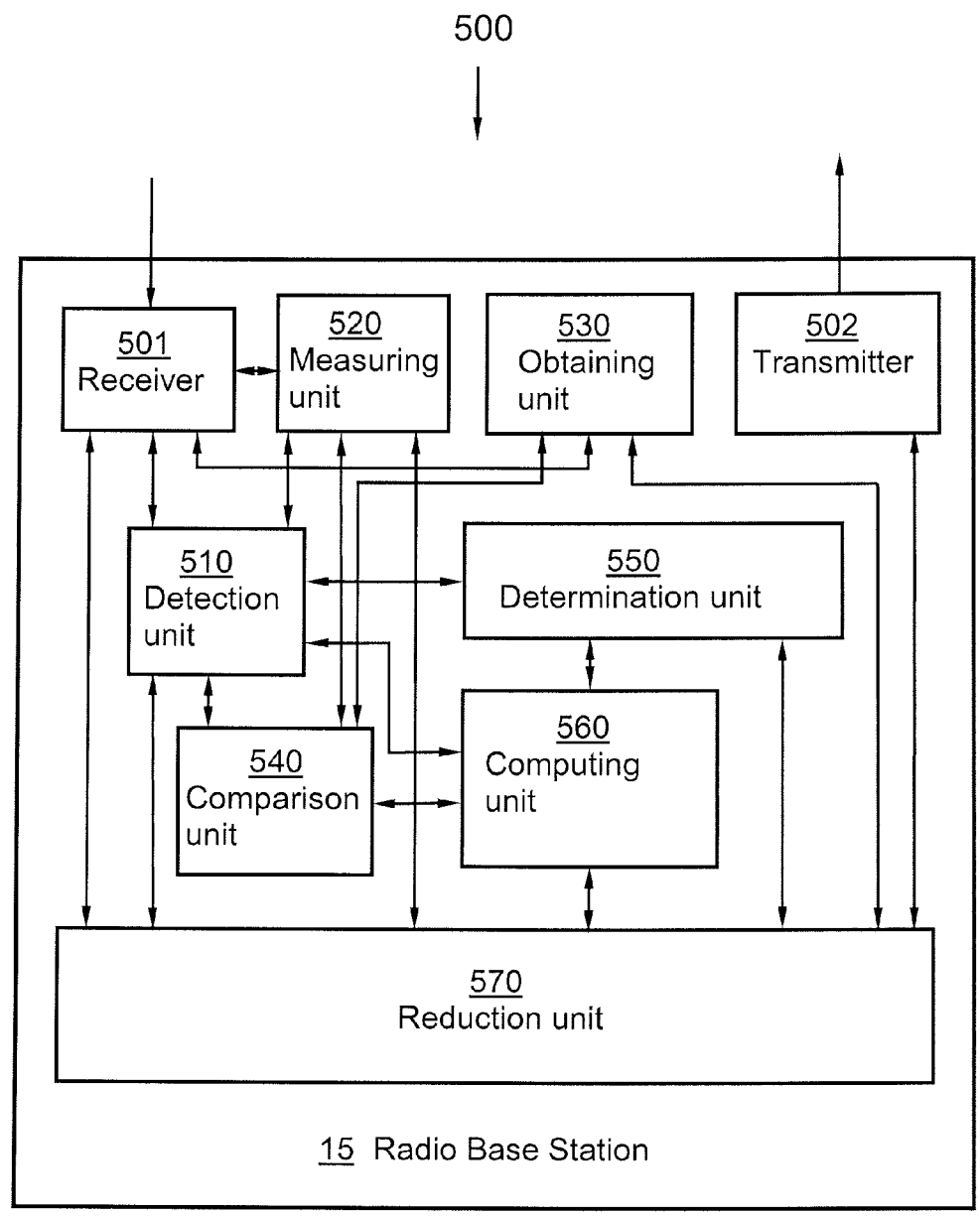
FIG. 5 is a block diagram illustrating embodiments of an arrangement in a radio base station.

FIG. 5 is a block diagram illustrating embodiments of an arrangement 500 situated in a radio base station 15. The radio base station 15 may be represented by e.g. a Node B.

The arrangement 500 is configured to perform the method steps 401-407 for detecting and reducing congestion in a radio access network 11. The radio base station 15 is comprised within the radio access network 11. Further, the radio base station 15 is adapted to control the bitrate flow of the incoming traffic to the radio base station 15. The traffic is incoming from a Radio Network Controller 10.

For the sake of clarity, any internal electronics of the arrangement 500, not completely necessary for performing the present method has been omitted from FIG. 5.

The arrangement 500 comprises a detection unit 510. The detection unit 510 is adapted to detect the occurrence of traffic congestion within the radio access network 11. Further, the arrangement 500 comprises a first determination unit 520. The first determination unit 520 is adapted to determine the congestion event type. Also, the arrangement 500 comprises a second determination unit 560. The second determination unit 560 is adapted to determine the bitrate reduction based on the determined congestion event type. Further yet, the arrangement 500 comprises a control unit 570. The control unit 570 is adapted to reduce the allowed bitrate flow of the incoming traffic to the radio base station 15, according to the calculated and determined bitrate reduction.

The control unit 570 may be represented by e.g. a Central Processing Unit (CPU), a processor, a microprocessor, or processing logic that may interpret and execute instructions. The control unit 570 may perform all data processing functions for inputting, outputting, and processing of data including data buffering and device control functions, such as call processing control, user interface control, or the like.

However, the arrangement 500 may optionally further comprise an obtaining unit 530. The obtaining unit 530 may be adapted to obtain the shaping bitrate concerning the traffic between the radio base station 15 and the radio network controller 10.

Also, the arrangement 500 further may comprise an optional measuring unit 540. The measuring unit 540 may be adapted to measure the bitrate on the incoming traffic to the radio base station 15.

Further, the arrangement 500 optionally may comprise an added comparison unit 550. The comparison unit 550 may be adapted to compare the obtained shaping bitrate with the measured incoming bitrate.

Optionally, according to some embodiments, the arrangement 500 may also comprise a receiving unit 501 and/or a sending unit 502.

It is to be noted that the described units 501-550 comprised within the arrangement 500 may be regarded as separate logical entities but not with necessity as separate physical entities. Any, some or all of the units 501-550 may be comprised or co-arranged within the same physical unit. However, in order to facilitate the understanding of the functionality of the arrangement 500, the comprised units 501-550 are illustrated as separate physical units in FIG. 5.

Some Particular Embodiments

The method in the radio base station 15 may be implemented through one or more processors 570 in the radio base station 15, together with computer program code for performing the functions of the present methods. The computer program code mentioned above may also be provided as a computer program product, for instance in the form of a data carrier carrying computer program code for performing the method according to the present invention when being loaded e.g. into the processor unit 570. The data carrier may be e.g. a CD ROM disc, a memory stick, or any other appropriate medium such as a disk or tape that can hold machine readable data. The computer program code can furthermore be provided as pure program code on a server and downloaded to the radio base station 15 remotely.

Further, a computer program comprising instruction sets for performing the method according to at least some of the method steps 401-407 may be used for implementing the previously described method in the radio base station 15.

The present invention may be embodied as a method and an arrangement in a radio base station 15, and/or computer program products. Accordingly, the present invention may take the form of an entirely hardware embodiment, a software embodiment or an embodiment combining software and hardware aspects all generally referred to herein as a "circuit". Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Furthermore, the present methods are described in part above with reference to flowchart illustrations in FIG. 2, FIG. 3 and FIG. 4 and/or block diagrams of an arrangement illustrated in FIG. 5 and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks in FIG. 2, FIG. 3, FIG. 4 and/or FIG. 5.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The terminology used in the detailed description of the particular exemplary embodiments illustrated in the accompanying drawings is not intended to be limiting of the invention.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. A method in a Radio Base Station for detecting and reducing congestion in a Radio Access Network, wherein the Radio Base Station is comprised within the Radio Access Network and is configured to control the bitrate allowed for a flow of traffic incoming to the Radio Base Station from a Radio Network Controller, the method comprising:

detecting the occurrence of traffic congestion within the Radio Access Network, measuring an incoming bitrate of said flow during a period of time, obtaining a shaping bitrate concerning the traffic between the Radio Base Station and the Radio Network Controller, comparing the obtained shaping bitrate with the measured incoming bitrate, determining a congestion event type describing a type of the detected traffic congestion as soft congestion or hard congestion, wherein if both soft congestion and hard congestion are detected said determining comprises determining the congestion event type as hard congestion, computing a bitrate reduction, for reducing the bitrate allowed for said flow, based on the comparison between the shaping bitrate and the measured bitrate and also based on the determined congestion event type, wherein the bitrate reduction is inversely correlated to the measured incoming bitrate, and reducing the bitrate allowed for said flow of traffic incoming to the Radio Base Station, according to the computed bitrate reduction.

2. The method according to claim 1, wherein measuring the incoming bitrate is performed a short time period in advance of computing the bitrate reduction.

3. The method according to claim 1, wherein the period of time for which the incoming bitrate of said flow is measured is 100 ms.

4. The method according to claim 1, wherein the magnitude of the bitrate reduction is bound by an upper limit value and a lower limit value, which values are set based on the measured incoming bitrate.

5. The method according to claim 1, wherein the magnitude of the bitrate reduction is set to a value between 0% and 50%.

6. The method according to claim 1, wherein said method is performed for each of a plurality of flows of traffic incoming to the Radio Base Station from the Radio Network Controller.

7. A Radio Base Station for detecting and reducing congestion in a Radio Access Network, wherein the Radio Base Station is comprised within the Radio Access Network and is configured to control the bitrate allowed for a flow of traffic incoming to the Radio Base Station from a Radio Network Controller, the Radio Base Station comprising:

a detection unit configured to detect the occurrence of traffic congestion within the Radio Access Network, a measurement unit configured to measure an incoming bitrate of said flow during a period of time, an obtaining unit configured to obtain a shaping bitrate concerning the traffic between the radio base station and the radio network controller, a comparison unit configured to compare the obtained shaping bitrate with the measured incoming bitrate, a determination unit configured determine a congestion event type describing a type of the detected traffic congestion as soft congestion or hard congestion, wherein if both soft congestion and hard congestion are detected said determining comprises determining the congestion event type as hard congestion, a computing unit configured to compute a bitrate reduction, for reducing the bitrate allowed for said flow, based on the comparison between the shaping bitrate and the measured bitrate and also based on the determined congestion event type, such as soft congestion or hard congestion, wherein the bitrate reduction is inversely correlated to the measured incoming bitrate, and a reduction unit configured to reduce the bitrate allowed for said flow of traffic incoming to the Radio Base Station, according to the computed bitrate reduction.

8. The Radio Base Station according to claim 7, wherein the measuring unit is configured to measure the incoming bitrate a short time period in advance of the computing unit computing the bitrate reduction.

9. The Radio Base Station according to claim 7, wherein the period of time for which the incoming bitrate of said flow is measured is 100 ms.

10. The Radio Base Station according to claim 7, wherein the magnitude of the bitrate reduction is bound by an upper limit value and a lower limit value, which values are set based on the measured incoming bitrate.

11. The Radio Base Station according to claim 7, wherein the magnitude of the bitrate reduction is set to a value between 0% and 50%.

12. The Radio Base Station according to claim 7, configured to control the bitrate allowed for each of a plurality of flows of traffic incoming to the Radio Base Station from a Radio Network Controller, and wherein said units are configured to operate per flow.

* * * * *

UNITED STATES PATENT AND TRADEMARK OFFICE
CERTIFICATE OF CORRECTION

PATENT NO.         : 8,605,592 B2                             Page 1 of 1
APPLICATION NO.    : 13/120354
DATED              : December 10, 2013
INVENTOR(S)        : Nadas et al.

It is certified that error appears in the above-identified patent and that said Letters Patent is hereby corrected as shown below:

On the Title Page, at Item (56), under "OTHER PUBLICATIONS", in Column 2, Line 4, delete "lub" and insert -- Iub --, therefor.

On Title Page 2, at Item (56), under "OTHER PUBLICATIONS", in Column 2, Line 1, delete ""Preventitive" and insert -- "Preventive --, therefor.

In the Specification

In Column 6, Line 58, delete "then" and insert -- than --, therefor.

Signed and Sealed this
Nineteenth Day of August, 2014

Michelle K. Lee
*Deputy Director of the United States Patent and Trademark Office*